United States Patent
Chang

(10) Patent No.: US 8,976,301 B2
(45) Date of Patent: Mar. 10, 2015

(54) TELEVISION TUNER AND METHOD THEREOF

(75) Inventor: Yi-Shu Chang, Tainan (TW)

(73) Assignee: Realtek Semiconductor Corporation, Hsinchu (TW)

( * ) Notice: Subject to any disclaimer, the term of this patent is extended or adjusted under 35 U.S.C. 154(b) by 2156 days.

(21) Appl. No.: 11/896,242

(22) Filed: Aug. 30, 2007

(65) Prior Publication Data

US 2008/0055487 A1     Mar. 6, 2008

(30) Foreign Application Priority Data

Sep. 1, 2006   (TW) .............................. 95132270 A

(51) Int. Cl.
*H04N 5/455* (2006.01)
*H04N 5/44* (2011.01)
*H04N 5/50* (2006.01)
*H04N 21/426* (2011.01)
*H04N 21/438* (2011.01)

(52) U.S. Cl.
CPC ................... *H04N 5/50* (2013.01); *H04N 5/455* (2013.01); *H04N 21/4263* (2013.01); *H04N 21/4384* (2013.01)
USPC .............................. 348/726; 348/725; 348/731

(58) Field of Classification Search
CPC .......... H04N 21/4233; H04N 21/4384; H04N 5/455; H04N 5/44; H04N 5/506
USPC ............................................ 348/706, 731–32
See application file for complete search history.

(56) References Cited

U.S. PATENT DOCUMENTS

| | | | | |
|---|---|---|---|---|
| 5,933,192 A | * | 8/1999 | Crosby et al. | 348/731 |
| 6,118,498 A | * | 9/2000 | Reitmeier | 348/725 |
| 6,519,011 B1 | * | 2/2003 | Shendar | 348/731 |
| 6,591,013 B1 | * | 7/2003 | Taunton | 382/233 |
| 6,714,264 B1 | | 3/2004 | Kempisty | |
| 6,927,806 B2 | * | 8/2005 | Chan | 348/731 |
| 7,203,457 B1 | * | 4/2007 | Wetzel | 455/3.02 |
| 7,343,140 B2 | * | 3/2008 | Hanrahan | 455/130 |
| 7,599,010 B2 | * | 10/2009 | Yen et al. | 348/731 |
| 2005/0094733 A1 | * | 5/2005 | Daniell | 375/240.25 |
| 2006/0059512 A1 | * | 3/2006 | Pugel | 725/33 |

FOREIGN PATENT DOCUMENTS

WO   WO-2006/065787 A2   6/2006

* cited by examiner

*Primary Examiner* — Benjamin R Bruckart
*Assistant Examiner* — Anthony Bantamoi
(74) *Attorney, Agent, or Firm* — McClure, Qualey & Rodack, LLP

(57) ABSTRACT

The invention provides a digital television tuner having at least two branches that receive a radio frequency signal, wherein the radio frequency signal carries M channels (M is a positive integer). A target image data is generated in real time since at least one of the branches pre-extracts the image compression data of the next channel to be switched to.

18 Claims, 16 Drawing Sheets

TELEVISION TUNER AND METHOD THEREOF

BACKGROUND OF THE INVENTION (a) Field of the Invention

The invention relates to a television tuner, and particularly to a tuner for digital television.

(b) Description of the Related Art

An analog television is easily influenced by terrain or landscape which brings about poor signal receiving and large signal amplitude fluctuation. A digital television (hereinafter referred to as "digital TV") that overcomes the cons of an analog television not only offers high quality image and audio but also more programs while using the same amount of bandwidth. In addition, the digital TV also provides functions supporting data broadcasting such that various services and interactivities are derived from the functions. However, drawbacks such as slow response speed and residual image during channel switching are still unacceptable to the general public for they are perceivable to human vision. Therefore, the popularity of the digital TV is yet to be promoted.

FIG. 1 illustrates a conventional digital TV tuner 10. The digital TV tuner 10 receives a digital radio frequency signal Rf while a signal is sent to a control unit CS according to the user command through a remote controller, a channel tuner or the like. The control unit CS generates a channel control signal C to select the signal according to the channel requested by the user. Then, the target image data T of the requested channel is generated after the signal is processed through filtering, demodulating, decoding. The control unit CS can be a central processing unit, CPU. The digital TV tuner 10 comprises a control unit CS, a RF tuner 11, a signal filter 12, a DTV IF demodulator 13, and a DTV image decoder 14. The signal filter 12 can be a surface acoustic wave (SAW) filter. The DTV image decoder 14 can be a digital TV MPEG decoder. The RF tuner 11 receives a digital radio frequency signal Rf and extracts a signal from the digital radio frequency signal Rf for the channel requested by the user according to the channel control signal C. The signal of that channel is thereby converted into a digital intermediate frequency signal If. The signal filter 12 receives the digital intermediate frequency signal If and generates a filtered intermediate frequency signal If'. Then, the DTV IF demodulator 13 of the digital TV converts the filtered intermediate frequency signal If' into a low frequency image compression data Ic. The DTV image decoder 14 then decodes the image compression data Ic into a target image data T and transmits the target image data T to a display device (not shown in the figure) for viewing.

At present, the image data format of the digital TV is generally chosen from specifications such as MPEG2, MPEG4, H.264, . . . and so forth. Assuming that the tuner 10 of the digital television is designed according to the MPEG standard, then the image data format is like what is shown in FIG. 2A. The image data includes I frames, P frames, and B frames. The I frames are scene image data and if one I frame switches to another I frame, the scene changes. The P frames are image data of scene translations while the B frames are image data regarding motions other than the scene. Generally, the MPEG encoded image data is transmitted with a certain sequence during transmission and decompression. As shown in FIG. 2A, when the user switches to a channel, the DTV IF demodulator 13 locks on the frequency band of that channel and converts the filtered intermediate frequency signal If' into a MPEG encoded image compression data Ic. Then, the DTV image decoder 14 decodes the first I frame i1 emerged from the image compression data Ic. The DTV image decoder 14 then receives the first emerged P frame p1. Finally, the DTV image decoder 14 predicts the B frame b1 based on the I frame i1 and the P frame p1 to process the image of that channel step by step.

When the user switches to another channel, the DTV IF demodulator 13 must lock onto the bandwidth of another channel and the DTV image decoder 14 then decodes the first emerged I frame. As the MPEG image data is transmitted with a certain sequence during transmission, the DTV image decoder 14 may or may not immediately receive the I frame of the switched channel and may receive the P frame instead. In the case of receiving the I frame immediately, the user will be able to see the image of the requested channel right away. However, if the P frame is received first, the user will have to wait a few more seconds until the I frame is received in order to display the entire image of the requested channel. Since it is more probable to receive a P frame first rather than an I frame, a delay will therefore appear when the user switches channels. As shown in FIG. 2B, when the user switches to channel 2, channel 3, and channel 4 at time t1, t2, and t3, the I frames of these channels appear at a later time of t1, t2, and t3, and thus experiences a serious delay of the images to be displayed when the user switches channels.

The inconvenience of the delay phenomenon while switching between digital TV channels has affected the promotion of digital TV. Hence, a digital TV tuner to reduce the time required for the re-locking and decoding and to achieve fast channel switching is yet to be provided.

BRIEF SUMMARY OF THE INVENTION

In light of the above mentioned problems, one objective of the invention is to provide a digital television tuner that reduces the required waiting time when user switches channels and to provide the fast channel switching function.

In order to achieve the above mentioned purpose, the invention provides a digital television tuner having two branches both receiving a radio frequency signal. The radio frequency signal carries M channels (M is a positive integer). The digital TV tuner comprises two RF tuners, two signal filters, two DTV IF demodulators, and a DTV image decoder.

The two RF tuners, provided in the two branches respectively, receive the same radio frequency signal. A first RF tuner extracts an Nth channel signal (N is a positive integer and N<M) from the frequency band of the radio frequency signal and converts the Nth channel signal into a first intermediate frequency signal. The second RF tuner extracts an (N+1)th channel signal or an (N−1)th channel signal from the frequency band of the radio frequency signal and converts the (N+1)th channel signal or the (N−1)th channel signal into a second intermediate frequency signal. When the user switches forward, the second RF tuner extracts a (N+1)th channel signal according to a channel control signal. When the user switches backward, the second RF tuner extracts a (N−1)th channel signal according to the channel control signal.

The two signal filters are provided in the two branches mentioned above, respectively. The first filter filters the first digital intermediate frequency signal to generate a first filtered intermediate frequency signal. The second filter filters the second digital intermediate frequency signal to generate a second filtered intermediate frequency signal.

The two DTV IF demodulators are provided in the two branches mentioned above, respectively. The first DTV IF demodulator receives the first filtered intermediate frequency signal to convert into a first image compression data. The second DTV IF demodulator receives the second filtered intermediate frequency signal to convert into a second image compression data.

The DTV image decoder receives and stores the first and the second image compression data and converts the first image compression data into a first target image data. The DTV image decoder converts the second image compression data into a second target image data when the user switches the channel to a channel including the second image compression data.

According to the invention, a digital TV tuner (such as a tuner with 3 branches) having Pn (Pn is a positive integer) branches and two methods for digital television tuning will be described in the following detailed description of the invention.

According to the invention, the digital TV tuner utilizes more than 2 (including 2) branches for pre-extracting the compressed image data of the next channel that the user may possibly switch to, when the user switches channel forward or backward. Hence, when the user switches to the next channel, the I frame of the corresponding channel can be accessed immediately from the compressed image data that has been already stored in the DTV image decoder without waiting for such I frame extracted from the compressed image data. Therefore, real time channel switching and fast TV channel selection can be achieved.

DETAILED DESCRIPTION OF THE INVENTION

Detailed description of the invention will be given herein with reference to the drawings in which one element is represented by the same symbol.

Figure 1:
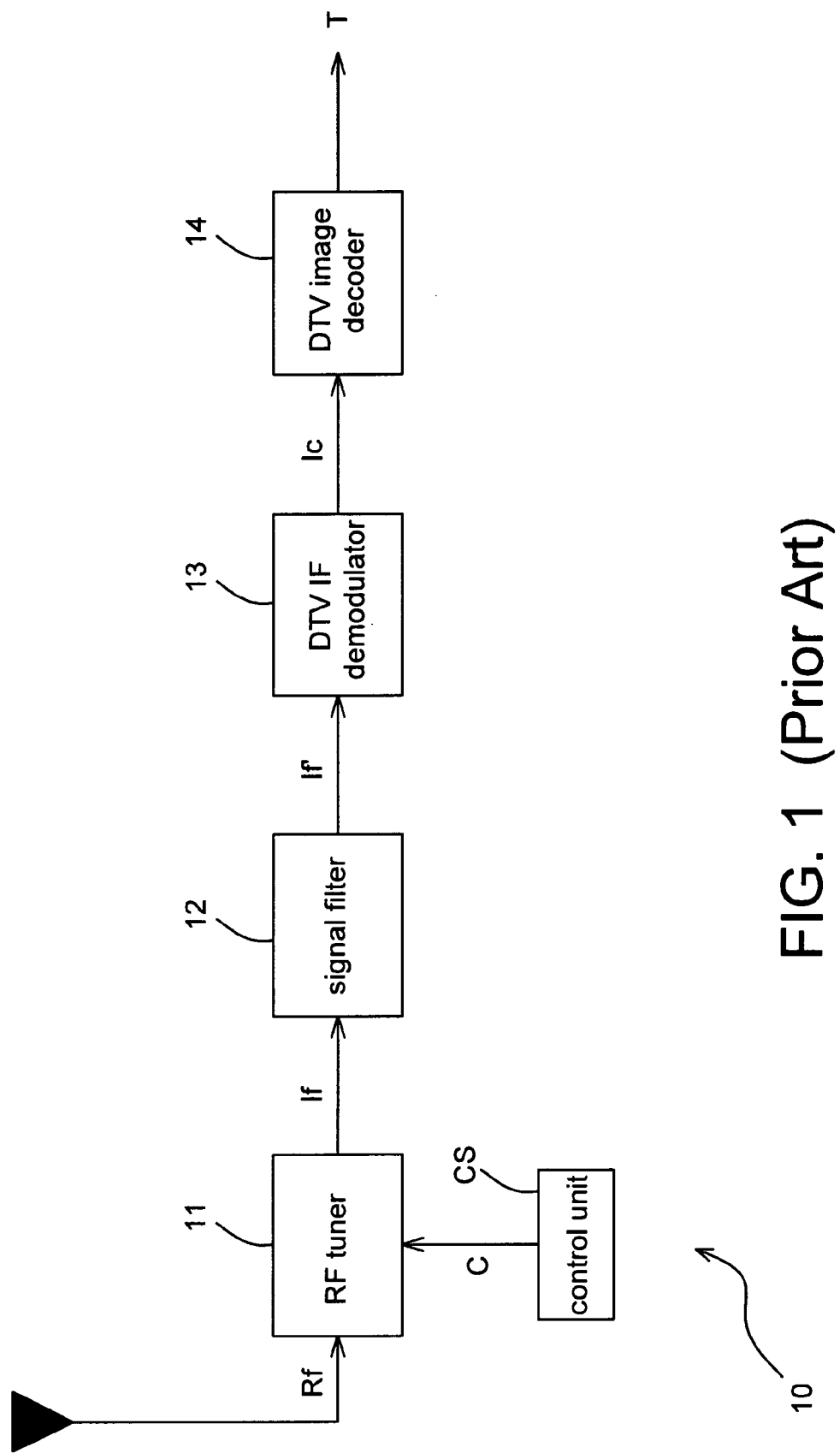
FIG. 1 shows a block diagram illustrating the digital television tuner according to the prior art.
Figure 2A:
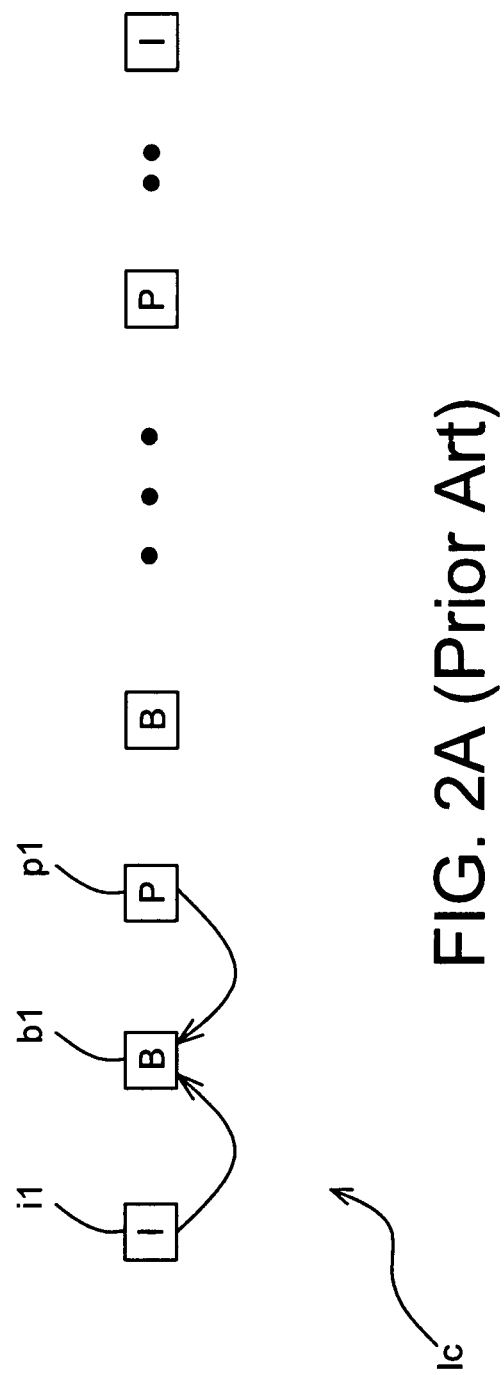
FIG. 2A shows a data format diagram illustrating an image data processed by the MPEG encoding specification.
Figure 2B:
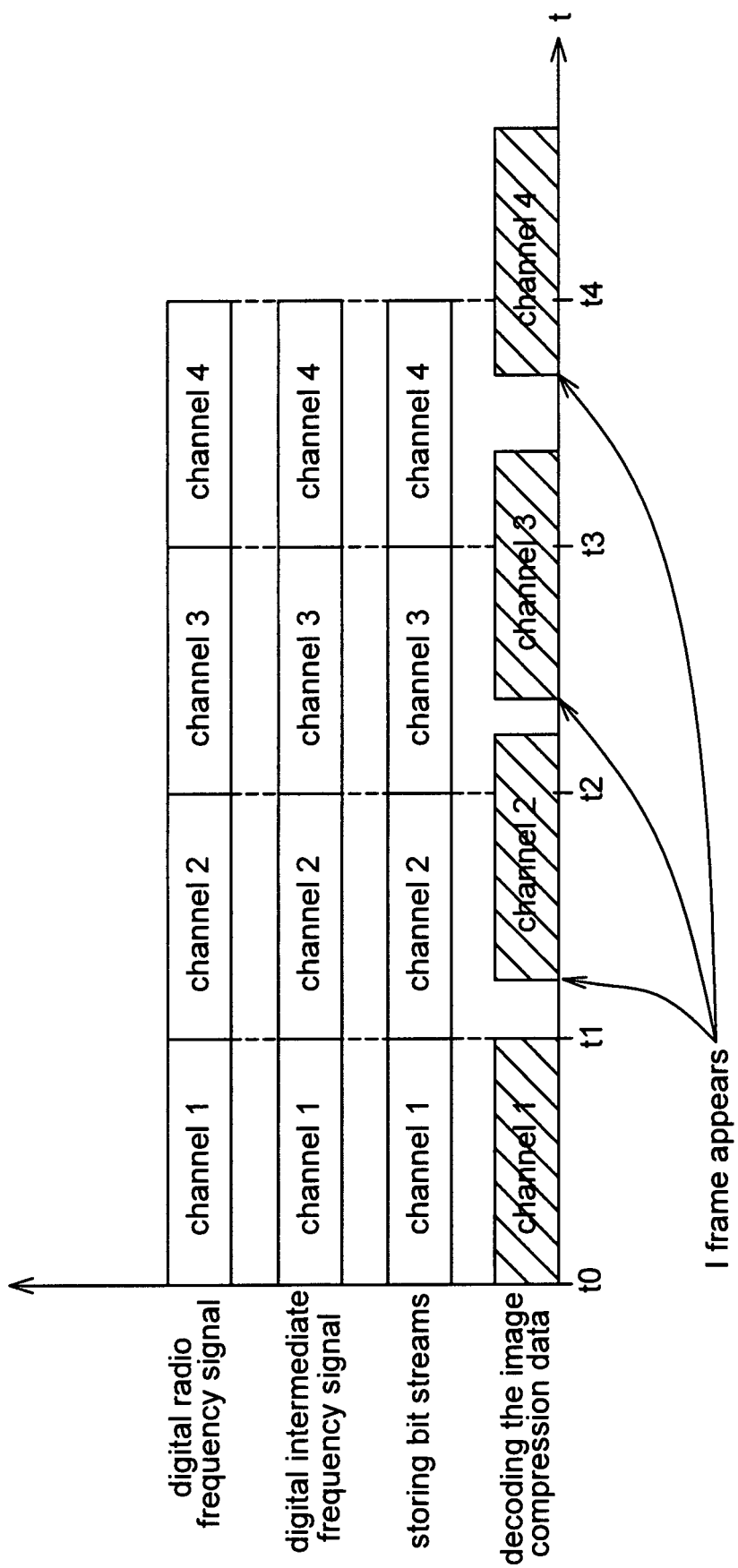
FIG. 2B shows a data flow timing sequence diagram illustrating the delay phenomenon happening while channel switching for a digital television tuner according to the prior art.
Figure 3A:
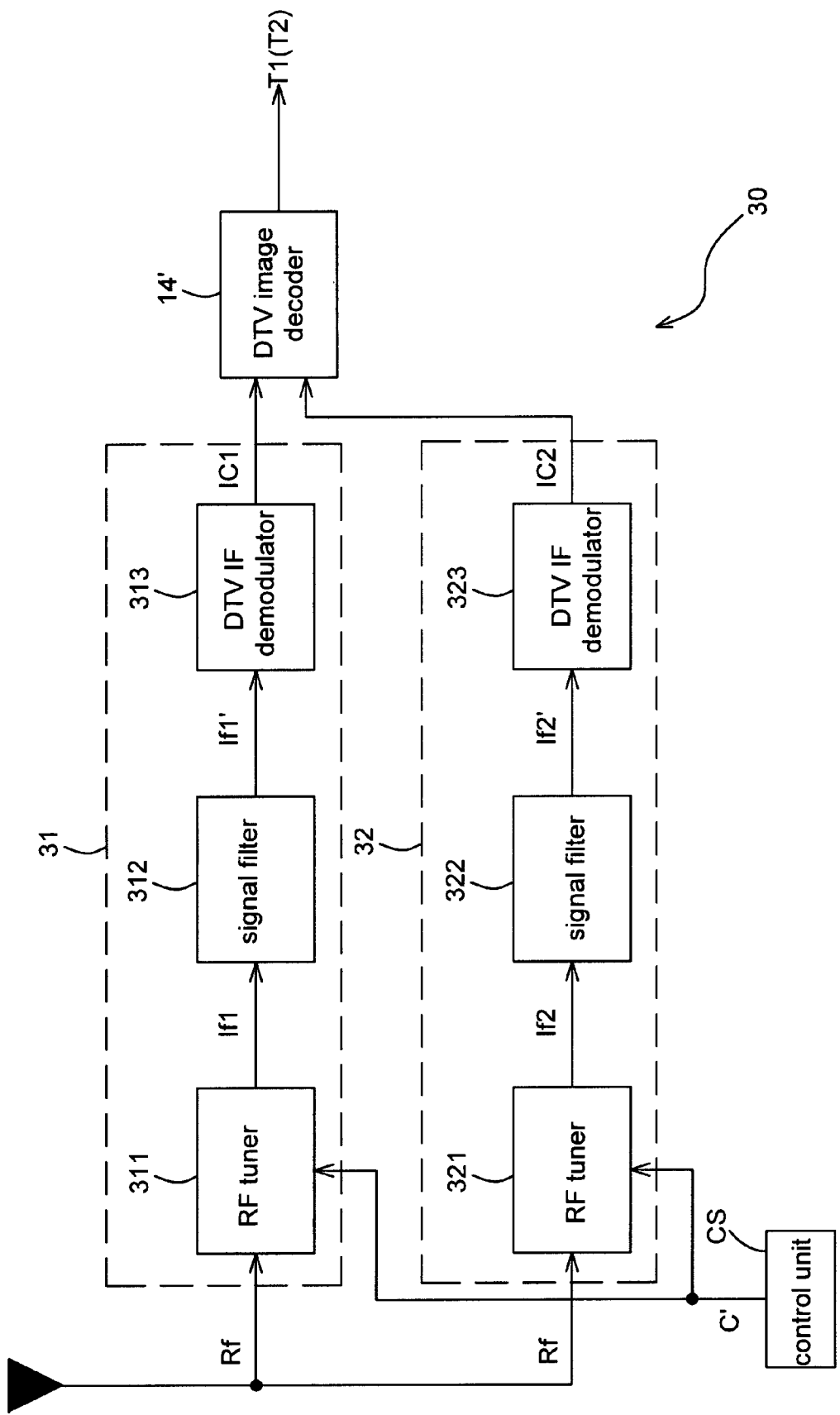
FIG. 3A shows a block diagram illustrating an embodiment of the digital television tuner of the invention.

FIG. 3A shows a preferred embodiment of the digital TV tuner 30 illustrated according to the invention. The digital TV tuner 30 comprises two branches 31 and 32, both receiving radio frequency signal Rf that carries M channels (M is a positive integer). The digital TV tuner 30 comprises a control unit CS, two RF tuners 311, 321, two signal filters 312, 322, two DTV IF demodulators 313, 323, and a DTV image decoder 14'.

The control unit CS generates a channel control signal C' according to the signal transmitted from a remote controller, a tuner unit or the like that is used for switching channels.

The RF tuners 311 and 321 are provided in the two branches, respectively. Both of the RF tuners receive the digital radio frequency signal Rf. The first RF tuner 311 extracts an Nth channel signal (N is a positive number and N<M) from the frequency band of the digital radio frequency signal Rf according to the channel control signal C' and converts the Nth channel signal into a first digital intermediate frequency signal If1. The second RF tuner 321 extracts an (N+1)th channel signal or an (N−1)th channel signal from the frequency band of the digital radio frequency signal Rf according to the channel control signal C' and converts the (N+1)th channel signal or the (N−1)th channel signal into a second digital intermediate frequency signal If2. When the user has a tendency of switching channels forward, the second RF tuner 321 records the current channel switching mode to be "forward channel switching" through a general learning mechanism and extracts the (N+1)th channel signal from the frequency band of the digital radio frequency signal Rf according to the channel control signal C'. For example, as the user switches from the $2^{nd}$ channel (the Nth channel) to the $3^{rd}$ channel (the (N+1)th channel), the second RF tuner 321 starts learning and is programmed into the mode of extracting the (N+1)th channel signal simultaneously whenever there is channel switching. Since the new number for N is now 3, the second RF tuner 321 not only extracts the $3^{rd}$ channel signal but also pre-extracts the $4^{th}$ channel signal for further processing by the device. When the user has a tendency of switching channels backward, the second RF tuner 321 records the current channel switching mode to be "backward channel switching" through the learning mechanism and extracts the (N−1)th channel signal from the frequency band of the digital radio frequency signal Rf according to the channel control signal C'. For example, as the user switches from the $3^{rd}$ channel (the Nth channel) to the $2^{nd}$ channel (the (N−1)th channel), the second RF tuner 321 starts learning and is programmed into the mode of extracting the (N−1)th channel signal simultaneously whenever there is channel switching. Since the new number for N is now 2, the second RF tuner 321 not only extracts the $2^{nd}$ channel signal but also pre-extracts the first channel signal for further processing by the device. It should be noted that in the present embodiment the second RF tuner 321 is designed to include the learning mechanism. Obviously, in another embodiment, the learning mechanism can be included in the control unit CS or the first RF tuner 311.

The signal filters 312 and 322 can be SAW filters, provided in the two branches respectively. The first signal filter 312 receives the first intermediate frequency signal If1 to perform filtering operation and thereby generate a first filtered intermediate frequency signal If1'. The second filter 322 receives the second intermediate frequency signal If2 to perform filtering operation and thereby generate a second filtered intermediate frequency signal If2'.

The DTV IF demodulators 313 and 323 are also provided in the two branches. The first DTV IF demodulator 313 receives the first filtered intermediate frequency signal If1' and converts the filtered intermediate frequency signal If1' into a first low-frequency image compression data IC1. The second DTV IF demodulator 323 receives the second filtered intermediate frequency signal If2' and converts the filtered intermediate frequency signal If2' into a second low-frequency image compression data IC2.

The specification of the DTV image decoder 14' can be selected from the group including the following: MPEG2, MPEG4, WMV9, VC1, DWVX and H.264 (but not limited to these specifications). The DTV image decoder 14' receives the first image compression data IC1 and the second image compression data IC2, stores these image compression data into a memory unit (not shown in the figure), decodes the first image compression data IC1 into a first target image data T1, and then transmits it to a display device (not shown in the figure). It should be noted that the DTV image decoder 14' only decodes the second image compression data IC2 into a second target image data T2 and then transmits the second target image data T2 to the display device whenever the user switches to the channel that includes the second image compression data IC2.

Figure 3B:
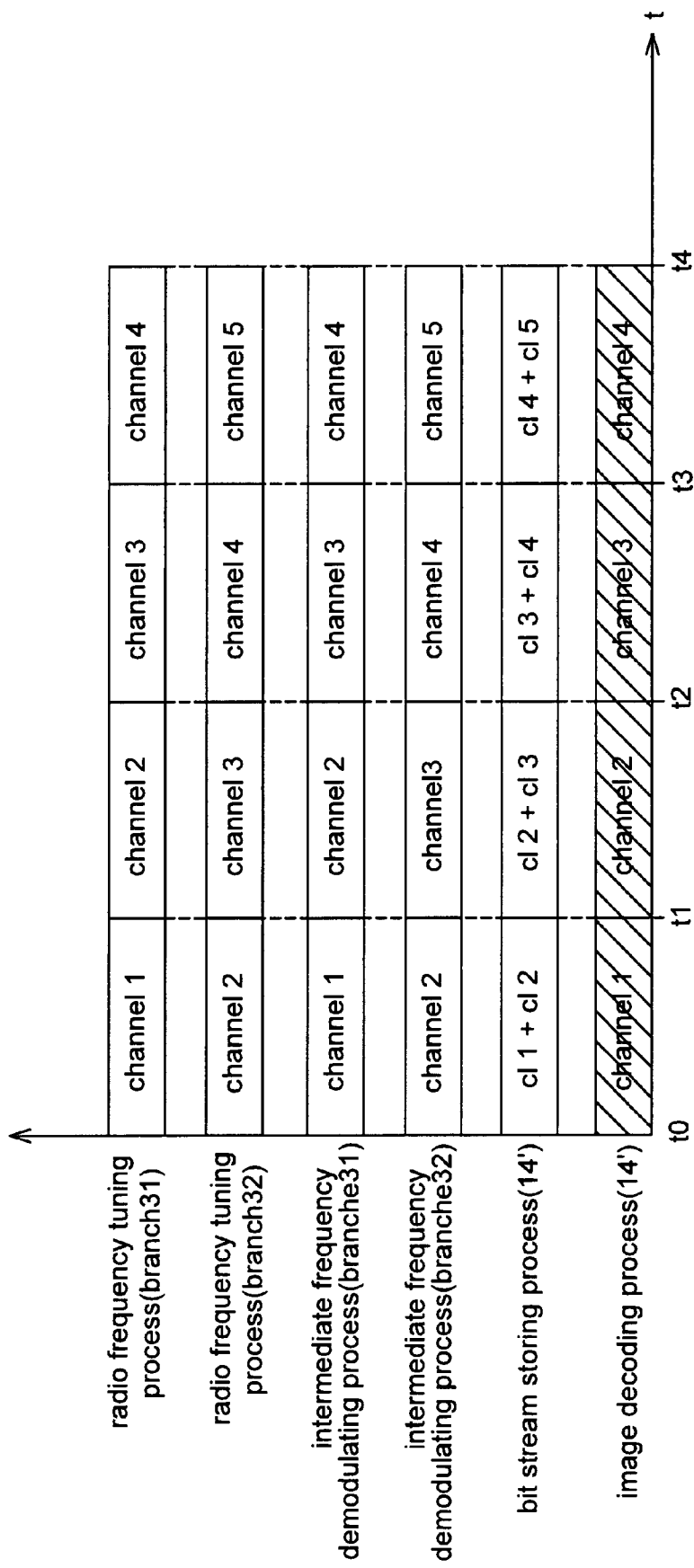
FIG. 3B shows a data flow diagram illustrating the timing sequence while channel switching for a digital television tuner of FIG. 3A.
Figure 3C:
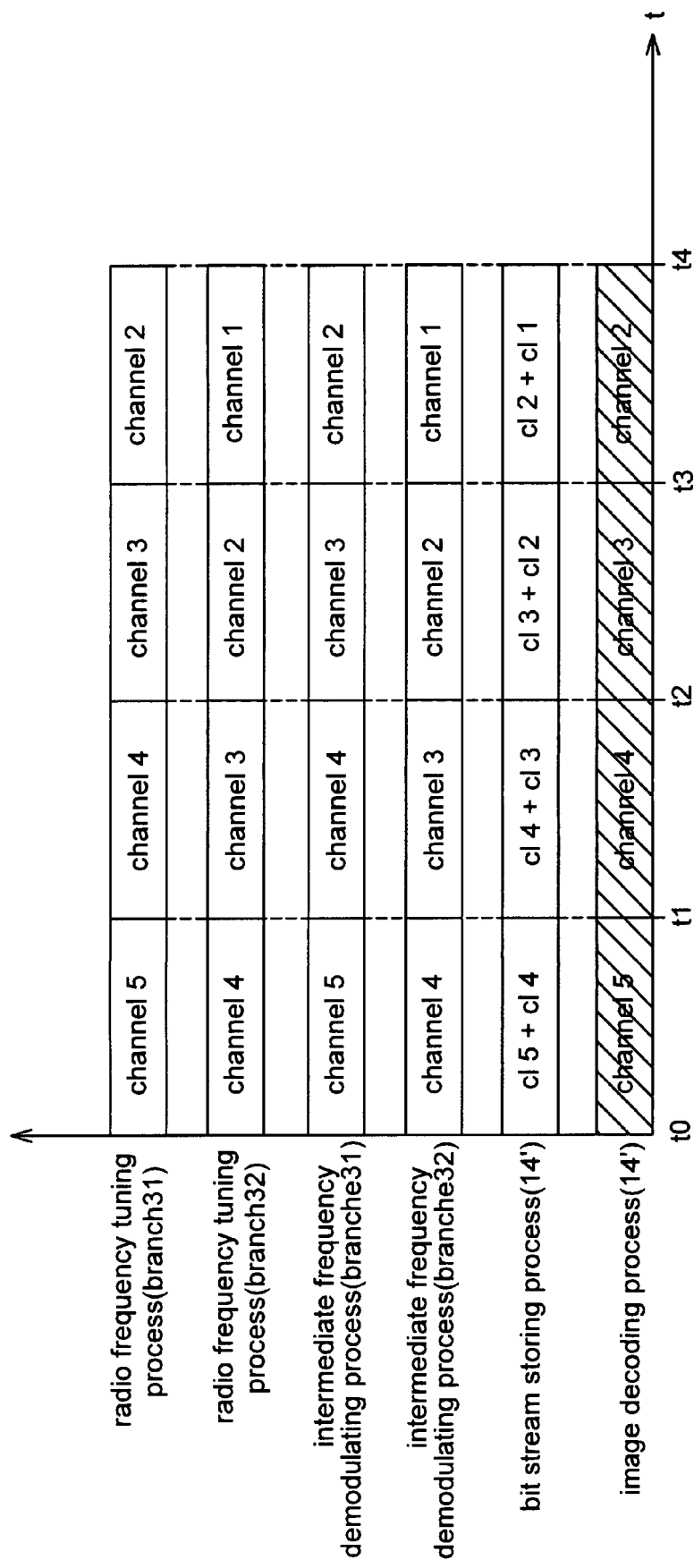
FIG. 3C shows a data flow diagram illustrating another timing sequence while channel switching for a digital television tuner of FIG. 3A.

Referring to FIGS. 3A, 3B, and 3C, a detailed description about the operation principle of the digital television tuner 30 of the invention will be given as follows. As shown in FIGS. 3B and 3C, the unit of the X coordinate is time. The "radio frequency tuning process" on the Y-axis refers to the process of utilizing the RF tuners 311 and 321 and the signal filters 312 and 322 to process the digital radio frequency signal Rf. The "intermediate frequency demodulating process" on the Y-axis refers to the process of utilizing the DTV IF demodulators 313 and 323 to process the first and the second filtered intermediate frequency signals If1' and If2'. The "bit stream storing process" on the Y-axis refers to the process of utilizing the DTV image decoder 14' to store the first and the second image compression data IC1 and IC2 (also called bit streams IC1 and IC2). The "image decoding process" on the Y-axis refers to the process of utilizing the DTV image decoder 14' to decode the image compression data of the channel currently requested by the user.

Referring to FIG. 3B, let us assume that the user's channel switching mode is "forward channel switching". Thus at time t0, the first RF tuner 311 and the second RF tuner 321 extract the 1st channel signal (i.e. the "Nth" channel signal) and the 2nd channel signal (i.e. the "(N+1)th" channel signal) from the frequency band of the digital radio frequency signal Rf according to the channel control signal C'. The 1st channel signal is hereinafter referred to as "channel 1" and the 2nd channel signal is hereinafter referred to as "channel 2", such as "channel N" refers to "the Nth channel". Channel 1 and channel 2 are processed by radio frequency tuning and intermediate frequency demodulating in the branches 31 and 32, respectively. Then, the image compression data IC1 and IC2 of the channels 1 and 2 are stored by the DTV image decoder 14'. Since the user has chosen channel 1 for the meantime, the DTV image decoder 14' decodes the image compression data IC1 of the channel 1 only and transmits the decoded target image data T1 to the display device. It should be noted that the DTV image decoder 14' has already stored the image compression data IC2 of the next channel (channel 2) that the user may switch to.

At time t1, the user switches forward to channel 2 where N=2 and the second RF tuner 321 records the user's switching mode to be "forward channel switching". The first RF tuner 311 and the second RF tuner 321 extract channel 2 (N) and channel 3 (N+1) from the frequency band of the digital radio frequency signal Rf, respectively. Channel 2 and channel 3 are processed by radio frequency tuning and intermediate frequency demodulating in branches 31 and 32. Since the DTV image decoder 14' has stored the image compression data IC2 of channel 2 before channel switching, the stored image compression data IC2 of channel 2 can be decoded directly and the I frame of the MPEG image data will be captured immediately. Therefore, the target image data T2 is generated completely in real time and the image of channel 2, which had been requested by the user, is displayed. The delay caused by waiting for the I frame of channel 2 to be displayed no longer happens. It should be noted that, at the same time, the DTV image decoder 14' has already stored the image compression data IC3 of the next channel (channel 3) that the user may switch to. Thereafter, at time t2, t3, and t4, the process may run in the same manner.

Referring to FIG. 3C, by assuming that the user's channel switching mode is "backward channel switching", then at time to, the first RF tuner 311 and the second RF tuner 321 will extract channel 5 and channel 4 from the frequency band of the digital radio frequency signal Rf according to the channel control signal C'. Channel 5 and channel 4 are processed with radio frequency tuning and intermediate frequency demodulating in the branches 31 and 32, respectively. Then, the image compression data IC5 and IC4 of the channels 5 and 4 are stored by the DTV image decoder 14'. Since the user has chosen channel 5 for the meantime, the DTV image decoder 14' decodes the image compression data IC5 of channel 5 and transmits the decoded target image data T1 to the display device. It should be noted that the DTV image decoder 14' also stores the image compression data IC4 of the next channel (channel 4) that the user may switch to.

At time t1, the user switches backward to channel 4 where N=4 and the second RF tuner 321 records the user's channel switching mode to be "backward channel switching". The first RF tuner 311 and the second RF tuner 321 extract channel 4 (N) and channel 3 (N−1) from the frequency band of the digital radio frequency signal Rf, respectively. Channel 4 and channel 3 are processed with radio frequency tuning and the intermediate frequency demodulating in the branches 31 and 32. Since the DTV image decoder 14' has stored the image compression data IC4 of channel 4 beforehand, the stored image compression data IC4 of channel 4 can be decoded directly, i.e. the I frame of the MPEG image data is captured immediately during channel switching. Thus, the target image data T2 is completely generated in real time and the image of channel 4 requested by the user is displayed. The delay caused by waiting for the I frame of the MPEG image data no longer happens. It should be noted that, at the same time, the DTV image decoder 14' has also stored the image compression data IC3 of the next channel (channel 3) that the user may switch to. Thereafter, at time t2, t3, and t4, the process may run in the same manner.

According to the above mentioned method, the digital TV tuner 30 is able to pre-extract the image compression data of the next channel that the user may possibly switch to through the learning mechanism provided in the second RF tuner 321 or the control unit CS during continuous channel switching, either forward or backward (or a tendency of switching either forward or backward). The problem of delay in displaying images during channel switching thereby is resolved.

Figure 3D:
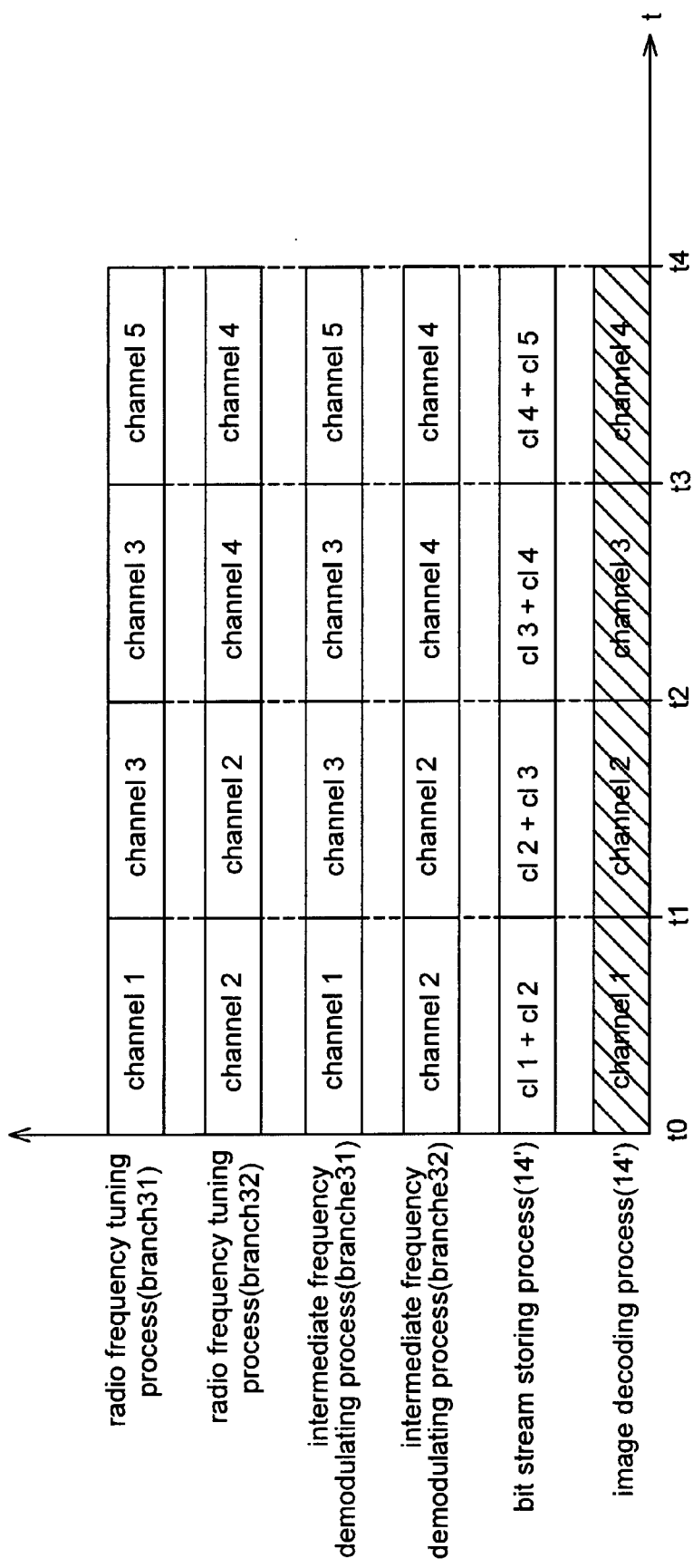
FIG. 3D shows a data flow diagram illustrating another timing sequence while channel switching for a digital television tuner of FIG. 3A.

In addition, another preferred embodiment of the digital TV tuner 30 can be as follows. Referring to FIGS. 3A and 3D, the definitions of the coordinates of the X and Y axes in FIG. 3D are the same as those in FIGS. 3B and 3C whereas details are omitted here for brevity. First of all, it is assumed that the user's channel switching mode is "forward channel switching", then at time t0 the first RF tuner 311 and the second RF tuner 321 extract channel 1 and channel 2 from the frequency band of the digital radio frequency signal Rf according to the channel control signal C', respectively. Channel 1 and channel 2 are processed with radio frequency tuning and intermediate frequency demodulating in the branches 31 and 32, respectively. Then, the image compression data IC1 and IC2 of the channels 1 and 2 are stored by the DTV image decoder 14'. Since the user has chosen channel 1 for the meantime, the DTV image decoder 14' decodes the image compression data IC1 of the channel 1 to generate a target image data T1 and transmits the target image data T1 to the display device. It should be noted that the DTV image decoder 14' has already stored the image compression data IC2 of the next channel (channel 2) that the user may switch to.

At time t1, the user switches forward to view channel 2 where N=2 and the control unit CS records the user's channel switching mode to be "forward channel switching" and generates the channel control signal C' to assign the first RF tuner 311 to extract the (N+1) channel and the second RF tuner 321 to extract the (N) channel. Thus, the first RF tuner 311 and the second RF tuner 321 extract channel 3 (N+1) and channel 2 (N) from the frequency band of the digital radio frequency signal Rf, respectively, and channel 3 and channel 2 are processed with radio frequency tuning and intermediate frequency demodulating in the branches 31 and 32, respectively. Since the DTV image decoder 14' has stored the image compression data IC2 of channel 2 before channel switching, the stored image compression data IC2 of channel 2 can be decoded directly and the I frame of the MPEG image data will be captured immediately. Therefore, the target image data T2 is generated completely in real time and the image of channel 2, which had been requested by the user, is displayed. The delay caused by waiting for the I frame of channel 2 to be displayed no longer happens. It should be noted that, at the same time, the DTV image decoder 14' has already stored the image compression data IC3 of the next channel (channel 3) that the user may switch to. Thereafter, at time t2, t3, and t4, the process may run in the same manner. On the other hand, the process regarding "backward channel switching" should work in a similar manner is omitted here for brevity. The difference between the processing in FIG. 3D and FIG. 3B is that the processing in FIG. 3D does not require the RF tuner to change the channel to be extracted each time the channel is switched, and is done by different implementations of the design.

Figure 4A:
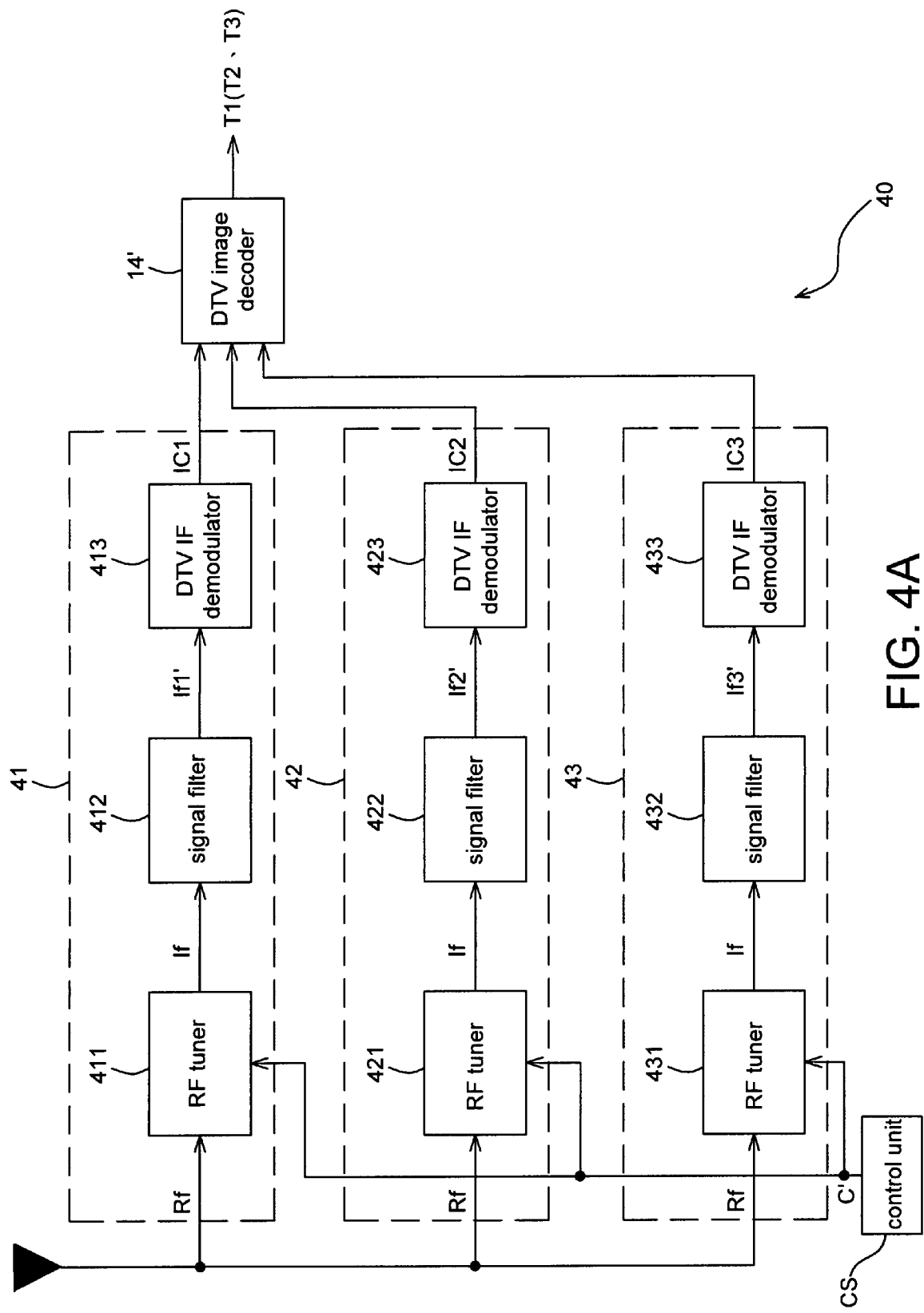
FIG. 4A shows a block diagram illustrating another embodiment of the digital television tuner of the invention.

FIG. 4A illustrates another embodiment of the digital TV tuner 40. The digital TV tuner device 40 is provided with three branches 41, 42, and 43. The digital TV tuner 40 comprises a control unit CS, three RF tuners 411, 421, 431, three signal filters 412, 422, 432, three DTV IF demodulator 413, 423, 433, and a DTV image decoder 14'. The structure of the digital TV tuner 40 is almost the same as that of the digital TV tuner 30. The difference is that the digital TV tuner 40 has one additional branch 43 to increase the number of pre-extracted channels so that the channel N that the user is currently viewing, the next channel (N+1) for the case of forward channel switching, and the next channel (N−1) for the case of backward channel switching can be extracted simultaneously.

During the operation of the digital TV tuner 40, all RF tuners receive the digital radio frequency signal Rf. The first RF tuner 411 extracts an Nth channel signal (N is a positive number and N<M) from the frequency band of the digital radio frequency signal Rf according to the channel control signal C' generated when the user switches channels and converts the Nth channel signal into a first digital intermediate frequency signal If1. The second RF tuner 421 extracts an (N+1)th channel signal from the frequency band of the digital radio frequency signal Rf according to the channel control signal C' and converts the (N+1)th channel signal into a second digital intermediate frequency signal If2. The third RF tuner 431 extracts an (N−1)th channel signal from the frequency band of the digital radio frequency signal Rf according to the channel control signal C' and converts the (N−1)th channel signal into a third digital intermediate frequency signal If3. The digital intermediate frequency signals If1, If2 and If3 are transmitted to the signal filters 412, 422, and 423 and the DTV IF demodulators 413, 423, and 433 to be processed with the conversion and demodulation processes so as to generate the first, the second, and the third image compression data IC1, IC2, and IC3.

Figure 4B:
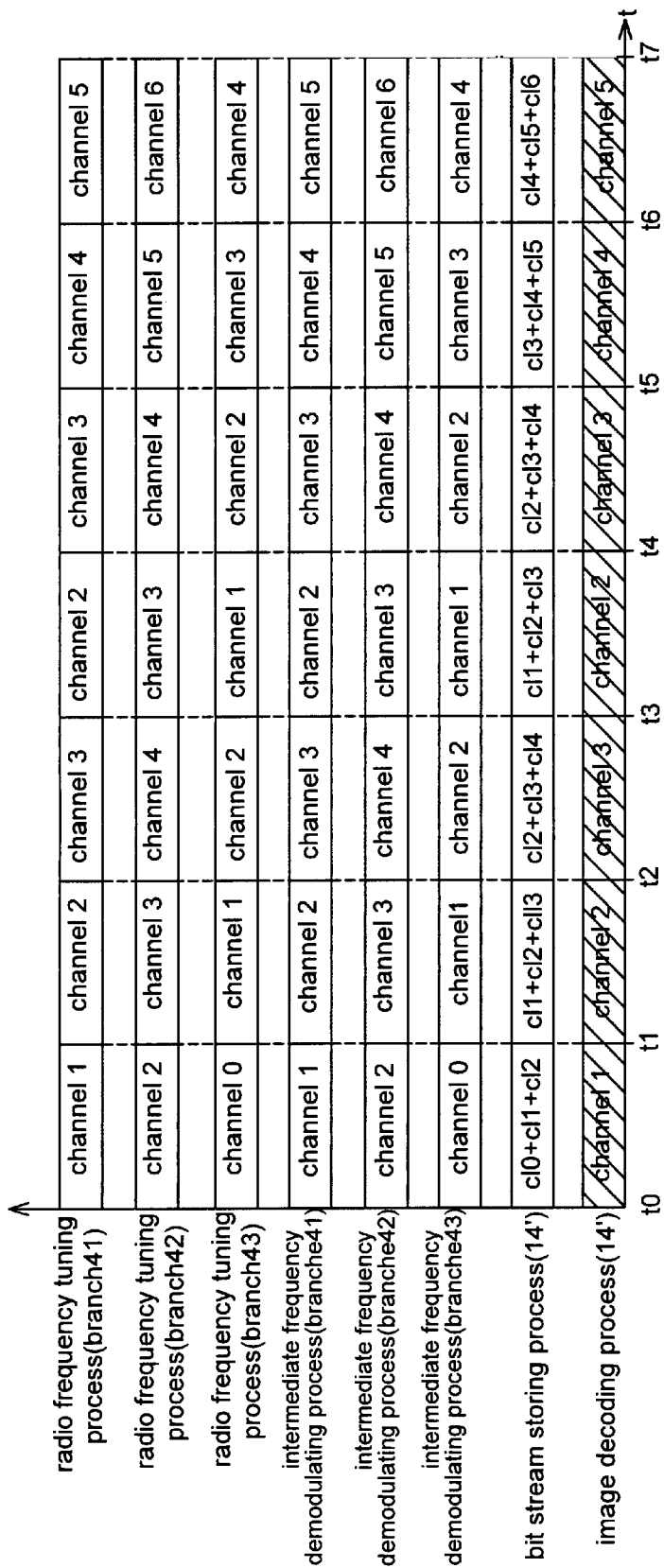
FIG. 4B shows a data flow diagram illustrating the timing sequence while channel switching for a digital television tuner of FIG. 4A.

Referring to FIGS. 4A and 4B, a detailed description about the operation principle of the digital TV tuner 40 of the invention will be given as follows. As shown in FIG. 4B, the definitions of the coordinates of the X, Y axes are the same as that in FIGS. 3B, 3C, and 3D. First of all, at time t0, the first, the second, and the third RF tuners 411, 421, and 431 extract the channel 1 (N), channel 2 (N+1), channel 0 (N−1) from the frequency band of the digital radio frequency signal Rf according to the channel control signal C', respectively. The channels 1, 2, and 0 are processed with radio frequency tuning and intermediate frequency demodulating in the branches 41, 42, and 43, respectively. Then, the image compression data IC1, IC2, and IC0 of the channels 1, 2, and 0 are stored by the DTV image decoder 14'. Since the user chooses to view the channel 1 for the meantime, the DTV image decoder 14' decodes the image compression data IC1 of the channel 1 and transmits the IC1 to the display device. It should be noted that the DTV image decoder 14' also stores the image compression data IC2 and IC0 of the next channels (forward channel 2 and backward channel 0) that the user may switch to.

At time t1, the user switches forward to view channel 2 where N=2 and the first, the second, and the third RF tuners 411, 421, and 431 extract channels 2(N), 3(N+1), and 1(N−1) from the frequency band of the digital radio frequency signal Rf, respectively. Channels 2, 3, and 1 are processed with the radio frequency tuning and intermediate frequency demodulating in the branches 41, 42, and 43, respectively. Since the DTV image decoder 14' has stored the image compression data IC2 of channel 2 beforehand, the stored image compression data IC2 of channel 2 can be decoded directly, i.e. the I frame of the MPEG image data is captured immediately during channel switching. Therefore, the target image data T2 is completely generated in real time and the image of channel 2 requested by the user is displayed. The delay caused by waiting for the I frame of the MPEG image data no longer happens. It should be noted that, at the same time, the DTV image decoder 14' has also stored the image compression data IC3 and IC1 of the next forward channel 3 and backward channel 1 that the user may switch to, and the image compression data IC0 of channel 0 that is originally stored may be deleted.

Then, at time t2, the user switches forward to channel 3, the procedures are the same as above. Thus, the DTV image decoder 14' decodes the image compression data of channel 3 and pre-stores the image compression data IC4 and IC2 of channels 4 and 2.

At time t3, the user starts to switch backward to channel 2 where N=2 and the first, the second, and the third RF tuners 411, 421, 431 thereby extract the channels 2(N), 3(N+1), and 1(N−1) from the frequency band of the digital radio frequency signal Rf, respectively. The channels 2, 3, and 1 are processed with radio frequency tuning and intermediate frequency demodulating in the branches 41, 42, and 43, respectively. Since the DTV image decoder 14' has stored the image compression data IC2 of channel 2 before channel switching, the stored image compression data IC2 of channel 2 can be decoded directly and the I frame of the MPEG image data will be captured immediately. Therefore the target image data T2 is generated completely in real time and the image of channel 2, which had been requested by the user, is displayed. The delay caused by waiting for the I frame of channel 2 no longer happens.

It should be noted that, at the same time, the DTV image decoder 14' has already stored the image compression data IC3 and IC1 of the next forward channel 3 and backward channel 1 that the user may switch to and the image compression data IC0 of the channel 0 originally stored may be deleted. Thereafter, at time t4~t7, the processes may run in the same manner.

According to the above mentioned method, the digital TV tuner 40 is able to pre-extract the image compression data of the next forward and backward channel that the user may possibly switch to through the learning mechanism provided in the second and the third RF tuners 421 and 431 or the control unit CS during continuous channel switching, either forward or backward (or a tendency of switching either forward or backward). The problem of delay in image displaying as seen in the conventional TV tuner 10 during channel switching is thereby resolved.

Figure 5:
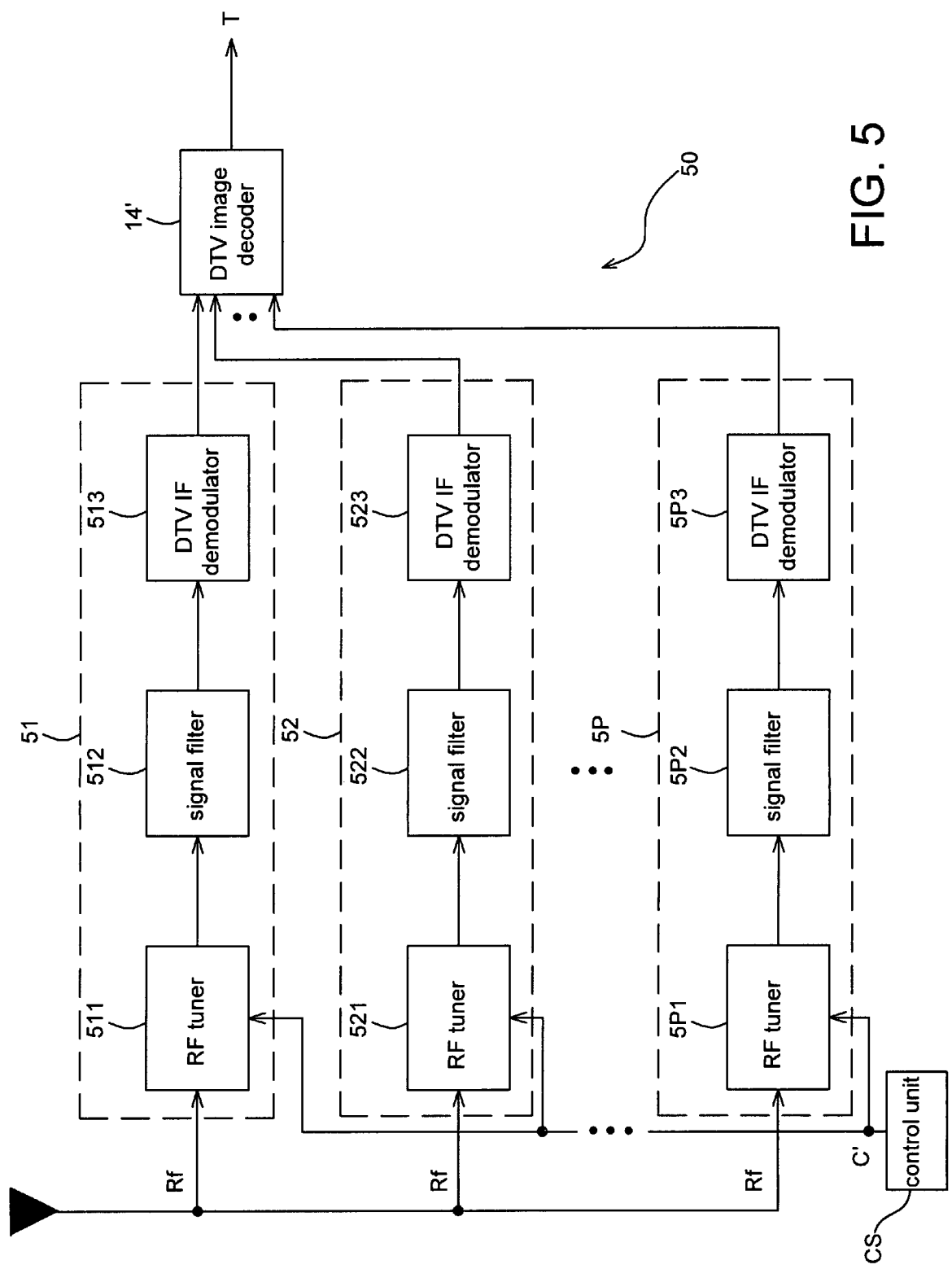
FIG. 5 shows a block diagram illustrating another embodiment of the digital television tuner of the invention.

It is apparent that the operation of the digital TV tuner 40 can also follow the operating mode as illustrated in FIG. 3D and its detail is not repeated here for brevity. Moreover, the more branches in utilization, the shorter the time required for channel switching. For instance, assume that there are Pn branches (Pn is a positive number and Pn<=M), then the required waiting time for channel switching is reduced to 1/Pn th of the original required time. As illustrated in FIG. 5, the digital TV tuner 50 includes Pn branches 51~5Pn and the waiting time for channel switching of the digital TV tuner 50 becomes 1/Pn th of that of the conventional TV tuner 10.

Figure 6A:
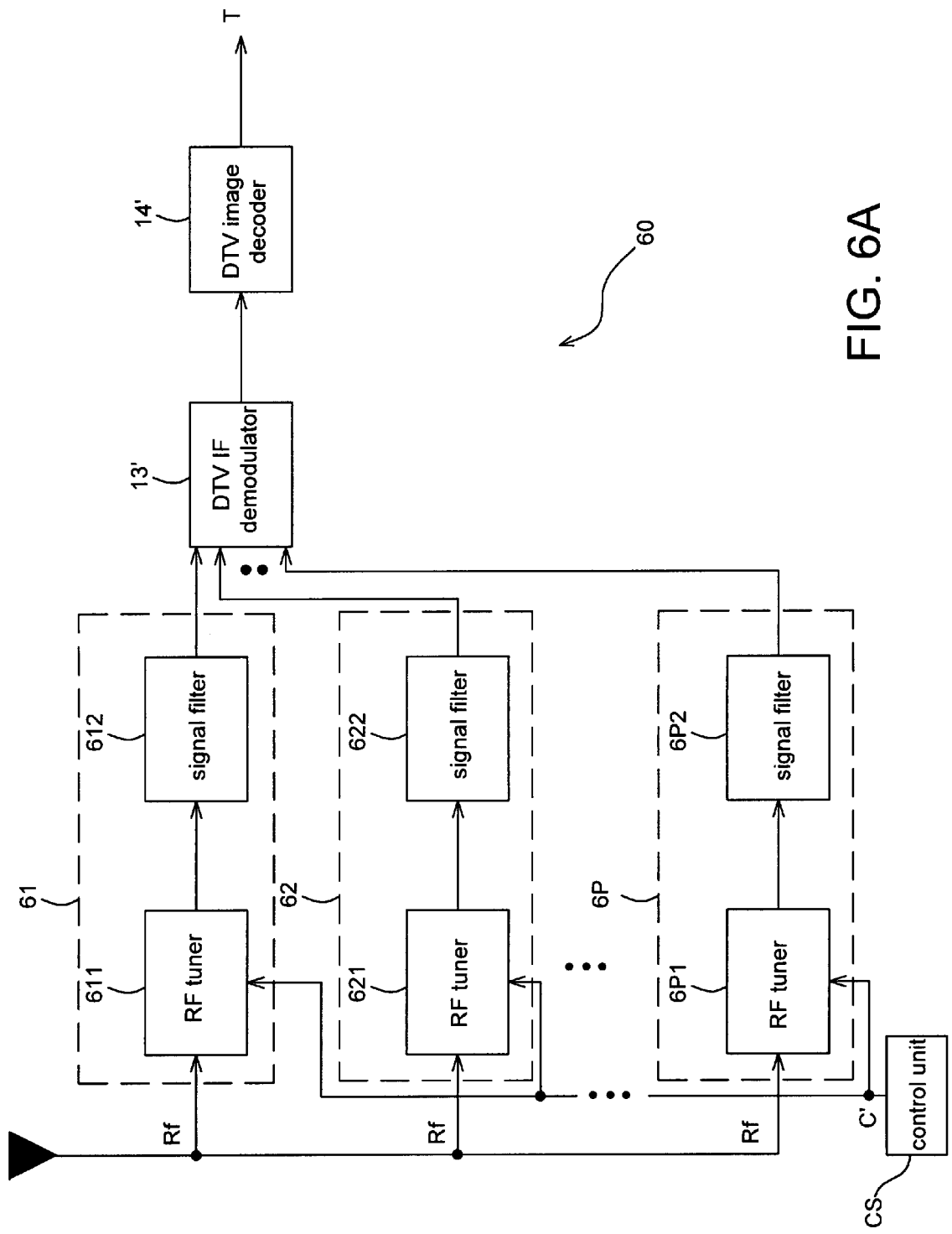
FIG. 6A shows a block diagram illustrating another embodiment of the digital television tuner of the invention.
Figure 6B:
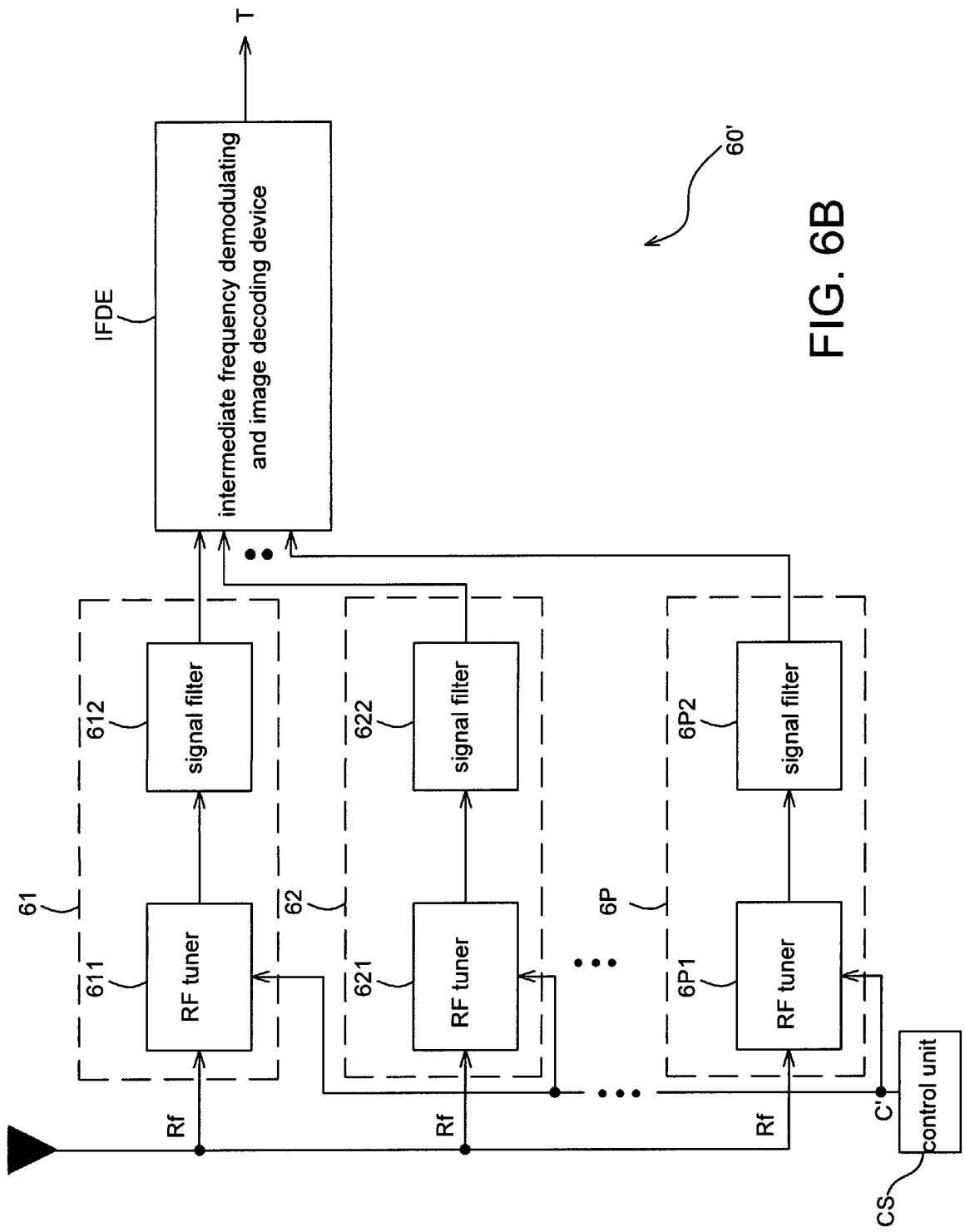
FIG. 6B shows a block diagram illustrating another embodiment of the digital television tuner of the invention.
Figure 7:
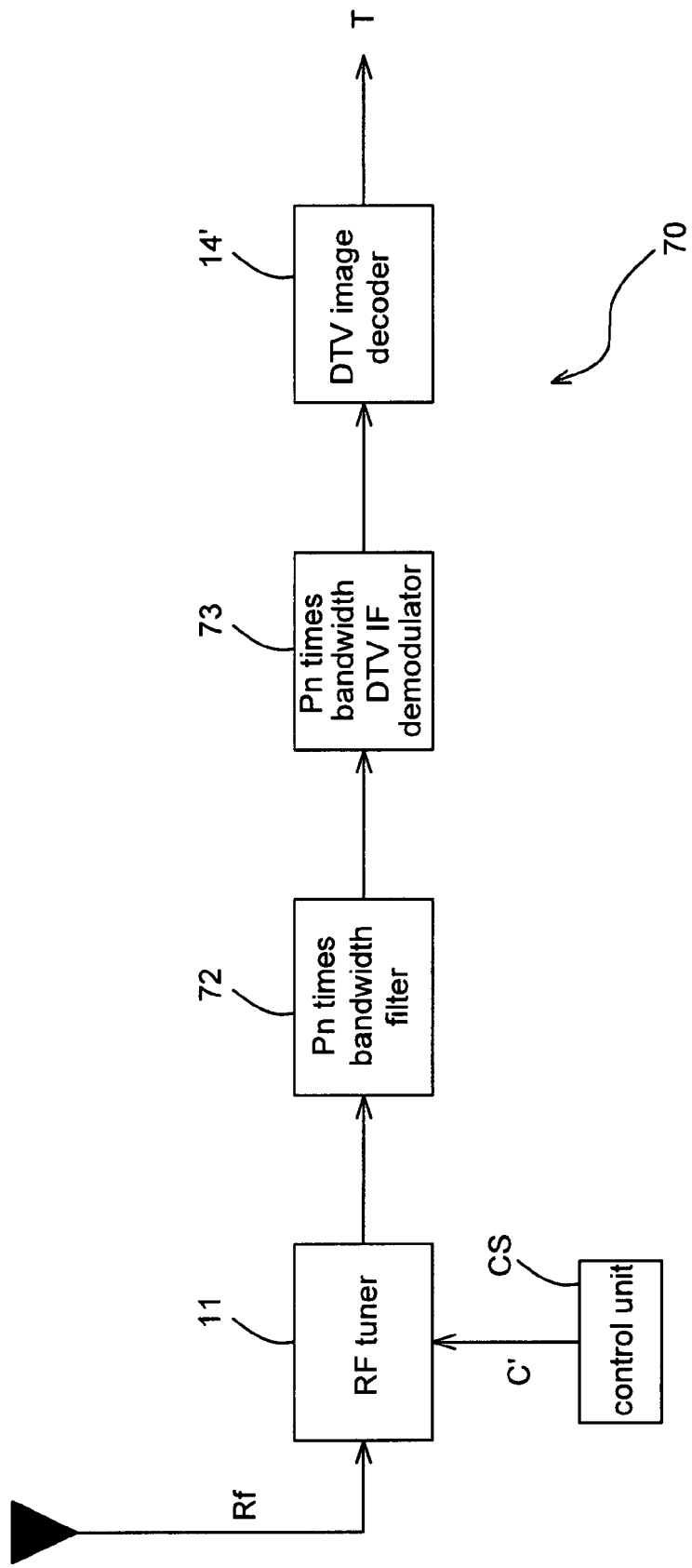
FIG. 7 shows a block diagram illustrating another embodiment of the digital television tuner of the invention.

The concept of the digital TV tuner of the invention can be implemented in a number of different approaches. As illustrated in FIG. 6A, the Pn DTV IF demodulators can be combined together and implemented by one single DTV IF demodulator 13' with a bandwidth of Pn times. On the other hand, as shown in FIG. 6B, the DTV IF demodulator 13' and the image decoder 14' can be combined into one single intermediate frequency demodulating and image decoding device (IFDE). This approach not only increases synchronization of the image data, but also reduces the conversion time of compressing and decoding. Therefore, optimum digital television channel selection is achieved. Furthermore, as shown in FIG. 7, the digital TV tuner 70 of the invention can also use a filter 72 with a bandwidth of Pn times and a DTV IF demodulator 73 also with a bandwidth of Pn times to replace the original Pn signal filters and DTV IF demodulators, such that die area or cost is reduced.

Figure 8A:
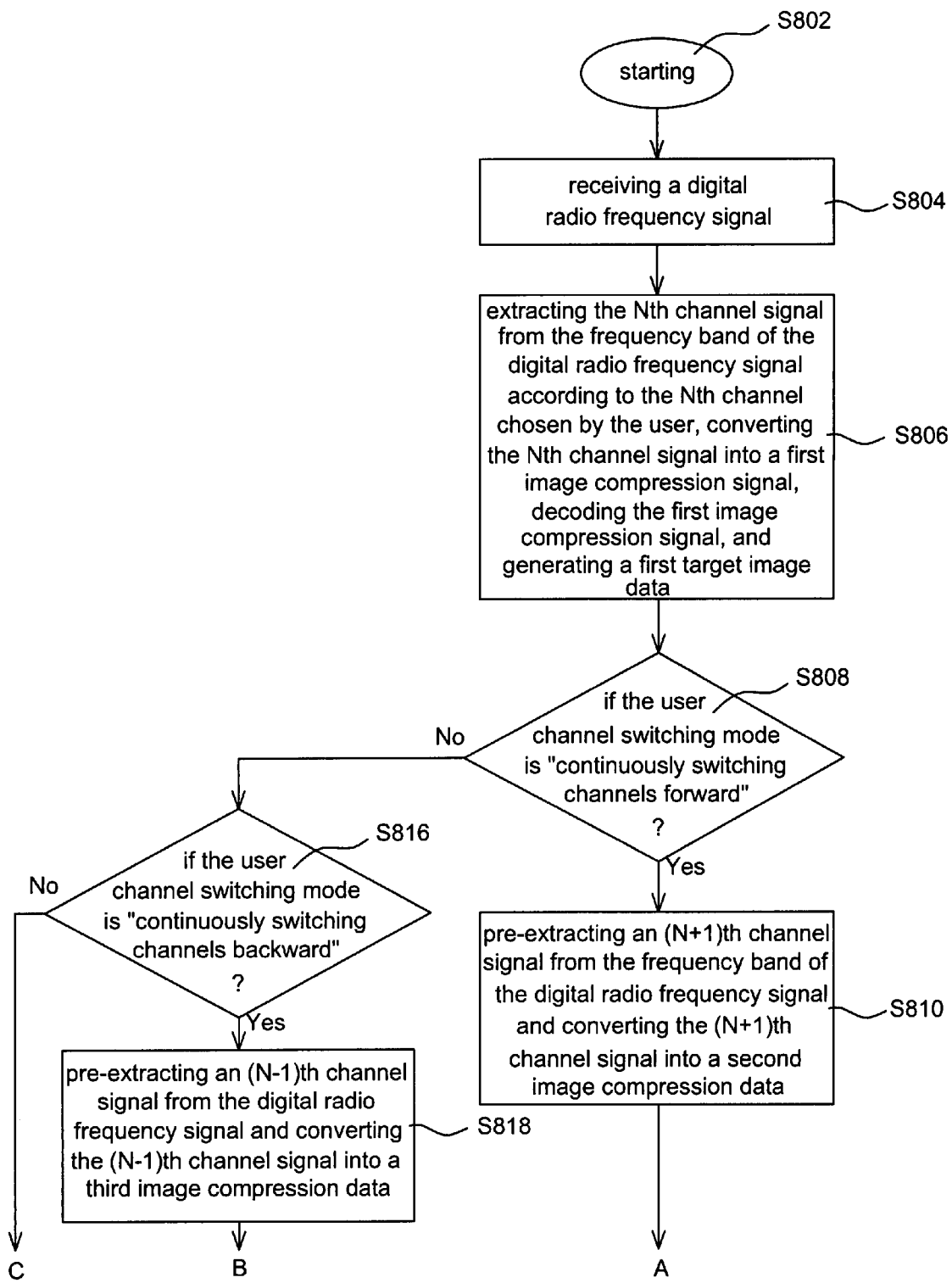
FIGS. 8A and 8B show flow chart diagrams illustrating an embodiment of digital television station selection method of the invention.
Figure 8B:
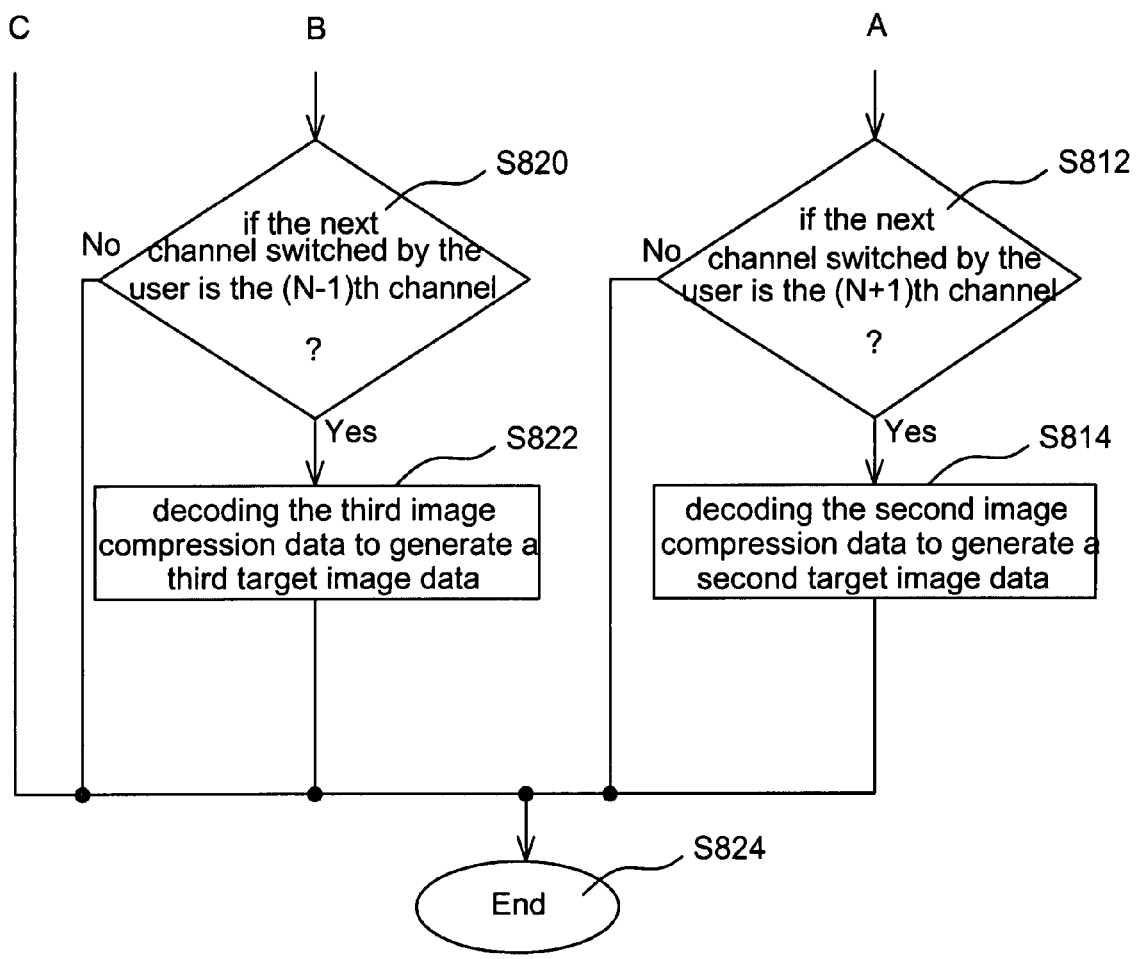

FIGS. 8A and 8B illustrate the flow chart diagrams of a method regarding a tuner in utilization. The method includes the following steps:

Step S802: starting;

Step S804: receiving a digital radio frequency signal carrying M channels (M is a positive number);

Step S806: extracting the Nth channel signal from the frequency band of the digital radio frequency signal according to the Nth channel (N is a positive number, N<M) chosen by the user, converting the Nth channel signal into a first image compression signal, decoding the first image compression signal, and generating a first target image data;

Step S808: determining if the user channel switching mode is "continuously switching channels forward" (a tendency of switching channels forward), and thereby jumping to step S810 if yes and to step S816 if no;

Step S810: pre-extracting an (N+1)th channel signal from the frequency band of the digital radio frequency signal and converting the (N+1)th channel signal into a second image compression data;

Step S812: determining if the next channel switched by the user is the (N+1)th channel and thereby jumping to step S814 if yes and to step S824 if no;

Step S814: decoding the second image compression data to generate a second target image data and jumping to step S824;

Step S816: determining if the user channel switching mode is "continuously switching channels backward" (a tendency of switching channels backward) and thereby jumping to step S818 if yes and to step S824 if no;

Step S818: pre-extracting an (N−1)th channel signal from the digital radio frequency signal and converting the (N−1)th channel signal into a third image compression data;

Step S820: determining if the next channel switched by the user is the (N−1)th channel and thereby jumping to step S822 if yes and to step S824 if no;

Step S822: decoding the third image compression data to generate a third target image data; and Step S824: End.

It should be noted that the specification of the above mentioned first, second, and third image compression data may be selected from the following, which includes: MPEG2, MPEG4, WMV9. VC1, DIVX and H.264. The first, the second, and the third target image data are transmitted to a display device for viewing.

Figure 9:
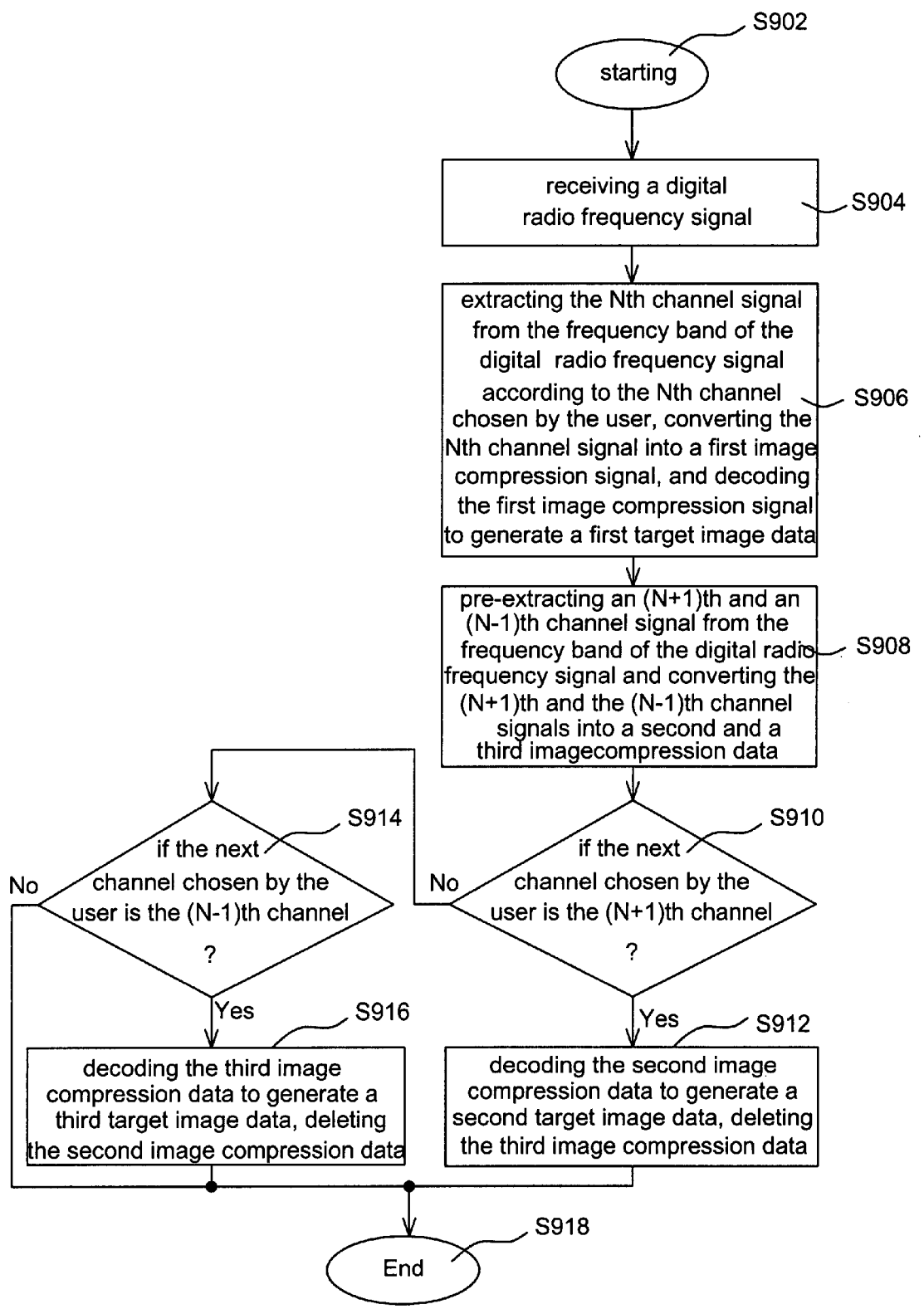
FIG. 9 shows a flow chart diagram illustrating another embodiment of digital television station selection method of the invention.

FIG. 9 illustrates the flow chart diagram of another method of the invention. The method comprises the following steps:

Step S902: starting;

Step S904: receiving a digital radio frequency signal carrying M channels (M is a positive number);

Step S906: extracting the Nth channel signal from the frequency band of the digital radio frequency signal according to the Nth channel (N is a positive number, N<M) chosen by the user, converting the Nth channel signal into a first image compression signal, and decoding the first image compression signal to generate a first target image data;

Step S908: pre-extracting an (N+1)th and an (N−1)th channel signal from the frequency band of the digital radio frequency signal and converting the (N+1)th and the (N−1)th channel signals into a second and a third image compression data;

Step S910: determining if the next channel chosen by the user is the (N+1)th channel and thereby jumping to step S912 if yes and to step S914 if no;

Step S912: decoding the second image compression data to generate a second target image data, deleting the third image compression data, and jumping to step S824.

Step S914: determining if the next channel chosen by the user is the (N−1)th channel and thereby jumping to step S916 if yes and to step S918 if no;

Step S916: decoding the third image compression data to generate a third target image data and deleting the second image compression data; and Step S918: End.

It should be noted that the specification of the above mentioned first, second, and third image compression data may be selected from the following, which includes: MPEG2, MPEG4, WMV9. VC1, DIVX and H.264. The first, the second, and the third target image data are transmitted to a display device for viewing.

The process of decoding and outputting image compression data should be modified according to the actual requirements (such as for overcoming hardware limitation, boosting effects, . . . , and so forth), regardless of the device or the method in the embodiments mentioned above. For instance, the image compression data stored in the memory unit can be accessed directly, in order to acquire the I frame and the P frame. The I frame and P frame or the P frame and B frame suitably acquired from the P frame are thus utilized. Otherwise, the I frame or P frame may be displayed directly.

Although the present invention has been fully described by the above examples with reference to the accompanying drawings, it should be noted that various changes and modifications may be made by those skilled in the art without departing from the scope of the present invention.

What is claimed is:

1. A tuner, having Pn branches (Pn is a positive integer), all receiving a radio frequency signal that carries M channels (M is a positive integer and M≥Pn), comprising:
   Pn radio frequency tuners, provided in the Pn branches for receiving the radio frequency signal, respectively, a first radio frequency tuner extracting an Nth channel signal (N is a positive integer and N<M) from the frequency band of the radio frequency signal and converting the Nth channel signal into a first intermediate frequency signal while a second radio frequency tuner extracts an (N+1)th channel signal or an (N−1)th channel signal from the frequency band of the radio frequency signal and converting the (N+1)th channel signal or the (N−1)th channel signal into a second intermediate frequency signal, wherein the Pn radio frequency tuners convert Pn channel signals into Pn intermediate frequency signals;
   an intermediate frequency demodulating and image decoding device for converting the first intermediate frequency signal into a first image compression data and the second intermediate signal into either a second image compression data or a third image compression data, and decoding the first image compression data into a target image data, wherein if the user switches to an (N+1)th channel corresponding to the (N+1)th channel signal, the image decoding device decodes the second image compression data into the target image data, and if the user switches to an (N−1)th channel corresponding to the (N−1)th channel signal, the image decoding device decodes the third image compression data into the target image data; and
   a signal filter with a bandwidth of Pn times, for filtering a number of Pn intermediate frequency signals.

2. The tuner as claimed in claim 1, wherein the second radio frequency tuner extracts the (N+1)th channel signal when the user switches channels forward and the second radio frequency tuner extracts the (N−1)th channel signal when the user switches channels backward.

3. The tuner as claimed in claim 1, wherein a third radio frequency tuner extracts the (N−1)th channel signal while the second radio frequency tuner extracts the (N+1)th channel signal and the third radio frequency tuner extracts the (N+1)th channel signal while the second radio frequency tuner extracts the (N−1)th channel signal.

4. The tuner as claimed in claim 3, wherein the third image compression data corresponding to the (N−1)th channel is deleted when the user switches from the Nth channel to the (N+1)th channel or the second image compression data corresponding to the (N+1)th channel is deleted when the user switches from the Nth channel to the (N−1)th channel.

5. The tuner as claimed in claim 1, further comprising:
   Pn signal filters, provided in the Pn branches, respectively, a first signal filter filtering the first intermediate frequency signal, a second signal filter filtering the second intermediate frequency signal, wherein the Pn signal filters filter Pn intermediate frequency signals.

6. The tuner as claimed in claim 5, wherein each of the Pn signal filters comprises a surface acoustic wave filter.

7. The tuner as claimed in claim 1, wherein the intermediate frequency demodulating and image decoding device comprises an intermediate frequency demodulator for converting the first and the second intermediate frequency signals into the first and the second image compression data or the third image compression data, wherein the intermediate frequency demodulator converts Pn intermediate frequency signals into Pn image compression data.

8. The tuner as claimed in claim 7, wherein the intermediate frequency demodulator comprises an intermediate frequency decoder with a bandwidth of Pn times.

9. The tuner as claimed in claim 1, wherein the intermediate frequency demodulating and image decoding device comprises Pn intermediate frequency demodulators for converting the first, the second, and the (Pn)th intermediate frequency signals into the first, the second, the third, and the (Pn)th image compression data, respectively.

10. The tuner as claimed in claim 1, wherein the intermediate frequency demodulating and image decoding device comprises an image decoder for decoding the first, the second, the third, or the (Pn)th image compression data into the target image data.

11. The tuner as claimed in claim 10, wherein the specification of the image decoder is selected from the group consisting of the following: MPEG2, MPEG4, WMV9. VC1, DIVX and H.264.

12. The tuner as claimed in claim 10, wherein the first, the second, . . . or the (Pn)th image compression data is decoded into the target image data to display the I frame and the P frame or the P frame and the suitable B frame derived from the P frame or displaying the I frame or the P frame directly.

13. The tuner as claimed in claim 10, wherein the image decoder stores the first, the second, and the (Pn)th image compression data into a memory unit.

14. A method for a tuner in utilization, comprising:
   receiving a radio frequency signal that carries M channels (M is a positive integer);
   extracting an Nth channel signal from the frequency band of the radio frequency signal in accordance with the Nth channel (N is a positive integer and N<M) selected by a user;
   converting the Nth channel signal into a first image compression data;
   decoding the first image compression data into a target image data;
   pre-extracting an (N+1)th channel signal or an (N−1)th channel signal from the frequency band of the radio frequency signal;
   converting the (N+1)th channel signal or the (N−1)th channel signal into a second image compression data or third image compression data, respectively; and
   decoding the second image compression data into the target image data if the user switches to the channel corresponding to the second image compression data, or decoding the third image compression data into the target image data if the user switches to the channel corresponding to the third image compression data wherein the third image compression data corresponding to the (N−1)th channel is deleted when the user switches from the Nth channel to the (N+1)th channel or the third image compression data corresponding to the (N−1)th channel is deleted when the user switches from the Nth channel to the (N+1)th channel.

15. The method for the tuner in utilization as claimed in claim 14, further comprising:
   determining, using a learning mechanism, a user tendency of switching channels forward or a user tendency of switching channels backward; and
   pre-extracting the (N+1)th channel signal from the frequency band of the radio frequency signal when the user has a tendency of switching channels forward and pre-extracting the (N−1)th channel signal from the frequency band of the radio frequency signal when the user has a tendency of switching channels backward.

16. The method for the tuner in utilization as claimed in claim 14, wherein the (N−1)th channel signal is also extracted while extracting the (N+1)th channel signal, and vice versa.

17. The method for the tuner in utilization as claimed in claim 16, wherein the second or the third compression data is decoded into the target image data to display the I frame and the P frame or the P frame and the suitable B frame derived from the P frame or displaying the I frame or the P frame directly.

18. The method for tuner in utilization as claimed in claim 16, wherein the target image data is outputted to a display device for viewing.

* * * * *